INVENTOR
John V. Fredd
ATTORNEYS

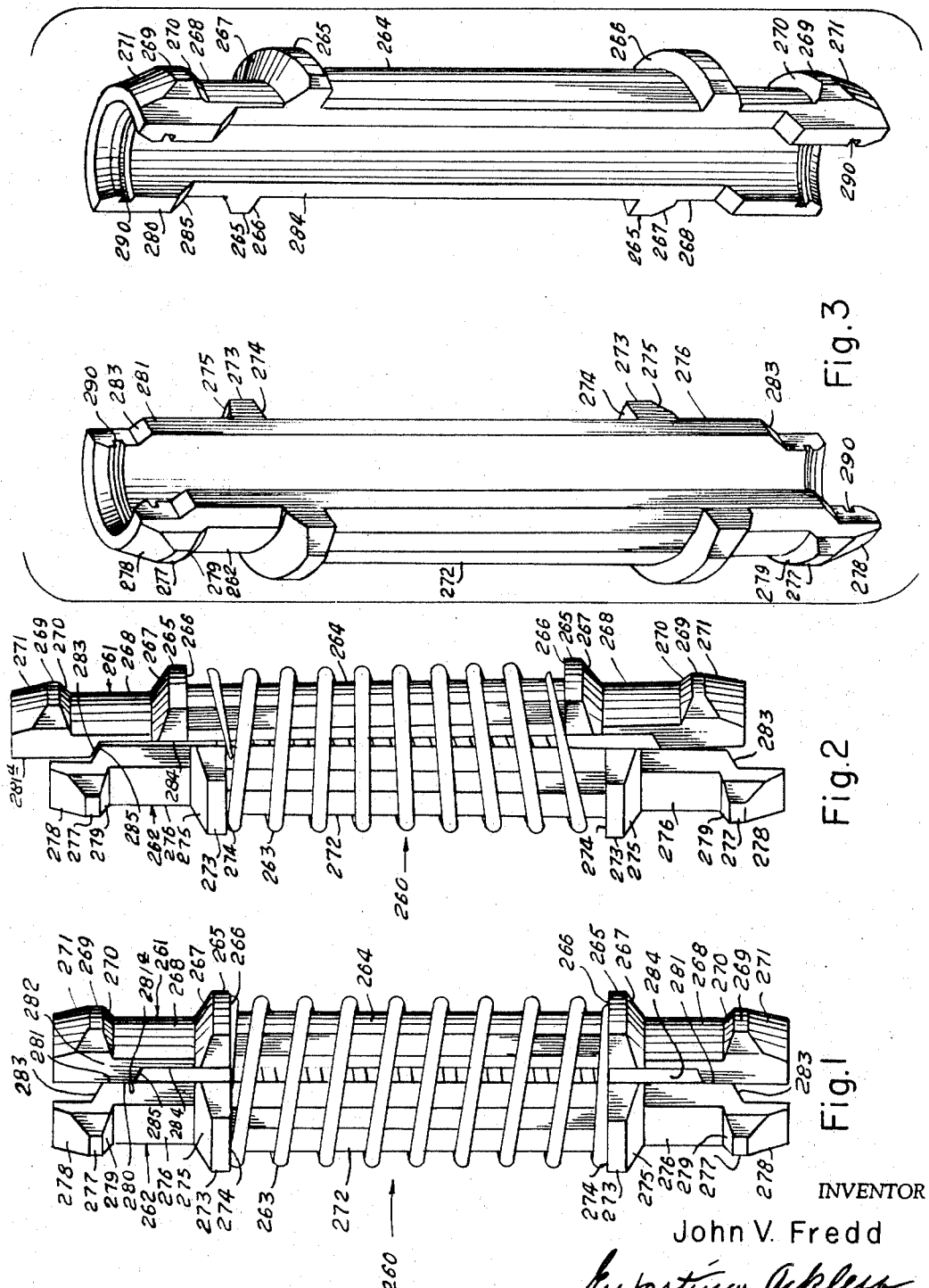

United States Patent Office 3,428,346
Patented Feb. 18, 1969

3,428,346
WELL TOOLS
John V. Fredd, Dallas, Tex., assignor to Otis Engineering Corporation, Dallas, Tex., a corporation of Delaware
Filed May 23, 1966, Ser. No. 552,106
U.S. Cl. 287—111                19 Claims
Int. Cl. F16b 7/00; F16d 1/10

ABSTRACT OF THE DISCLOSURE

A quick coupler having a pluraliy of longitudinally movable coupler members engageable with each other for coupling spaced members in an articulated manner. Said coupler members having co-engageable surfaces normally holding said members in coupling position and movable to inoperative position upon longitudinal relative movement between said members to permit said coupler members to be disengaged from coupled relationship with the bodies.

---

This invention relates to well tools and more particularly relates to coupling devices for forming an articulated connection between adjacent spaced bodies.

It is one object of the invention to provide a connecting device.

It is a particularly important object of the invention to provide a coupler for forming an articulated connection between adjacent spaced bodies.

It is another object of the invention to provide a coupler for connecting adjacent spaced bodies whereby such bodies are movable within predetermined limits relative both to each other and to the coupler.

It is another object of the invention to provide a coupler having opposite end portions which are releasably received within locking socket chambers of adjacent spaced bodies interconnected by the coupler.

It is another object of the invention to provide a coupler having opposite end portions each of which is separately insertable one at a time into a locking socket chamber of a body when the components of the coupler are moved relative to each other from first relative positions to second relative positions, such component not being removable from such sockets when returned to such first relative positions.

It is another object of the invention to provide a coupler for connecting adjacent spaced bodies including relatively movable components biased to neutral positions at which the coupler is releasably lockable with said bodies.

It is another object of the invention to provide a coupler comprising a pair of body members biased by spring means to a position of generally parallel relationship and movable relative to each other against such spring means to a non-parallel relationship at which adjacent end portions of the body members at one end of the coupler are compressed toward each other while adjacent end portions of the body members at the other end of the coupler are slightly expanded.

It is still another object of the invention to provide a coupler comprising a pair of longitudinal body members having facing longitudinal edge surfaces engaging each other when the members are longitudinally aligned to hold the members in generally parallel relationship and having cooperating longitudinal recesses and lugs permitting the body members to be shifted to a non-parallel relationship with adjacent end portions of the members being compressible together at one end upon relative longitudinal displacement of the members in one direction and at the other end upon longitudinal displacement in the other direction.

It is another object of the invention to provide a coupler comprising a pair of male and female body members each of which is generally half cylindrical in shape having end locking flanges and intermediately positioned spaced supporting flanges for holding a biasing spring encompassing both of said members to bias them toward longitudinal alignment with each other, one of such members being a female member provided with longitudinally extending female recesses along its longitudinal inside edge surfaces and the other of such members being a male member having longitudinally extending male lugs along each of its longitudinal inside edge surfaces, the male lugs being of greater length than the female recesses whereby when the body members are longitudinally aligned they are held in generally parallel relationship by coengagement of their inside longitudinal edge surfaces and when longitudinally misaligned against the force of the spring such body members are compressible together along end portions at one end of the coupler when misaligned in one direction and at the other end of the coupler when misaligned in the other direction.

The invention, therefore, is directed toward a coupler for interconnecting adjacent ends of spaced bodies in articulated manner having means engageable with said spaced bodies when in an operative position, said coupling members being movable longitudinally with respect to each other to permit movement of said engaging means to inoperative non-coupling position to disconnect the bodies. The coupler members are resiliently held in the normal coupling position.

Additional objects and advantages of the invention will be readily apparent from the reading of the following description of a device constructed in accordance with the invention, and reference to the accompanying drawings thereof, wherein:

FIGURE 1 is a longitudinal view in elevation of a coupler embodying the invention with its body members longitudinally aligned and in generally parallel relationship;

FIGURE 2 is a longitudinal view in elevation of the coupler of FIGURE 1 with its body members misaligned longitudinally and compressed together along one end portion for coupling such end of the coupler into a socket recess of a body to be connected with the coupler;

FIGURE 3 is a longitudinal exploded view in perspective of the coupler body members with the coupler spring removed; and, FIGURES 4A and 4B taken together constitute a longitudinal view partially in section and partially in elevation illustrating adjacent spaced bodies interconnected by the coupler shown in FIGURES 1–3.

Figure 4B:
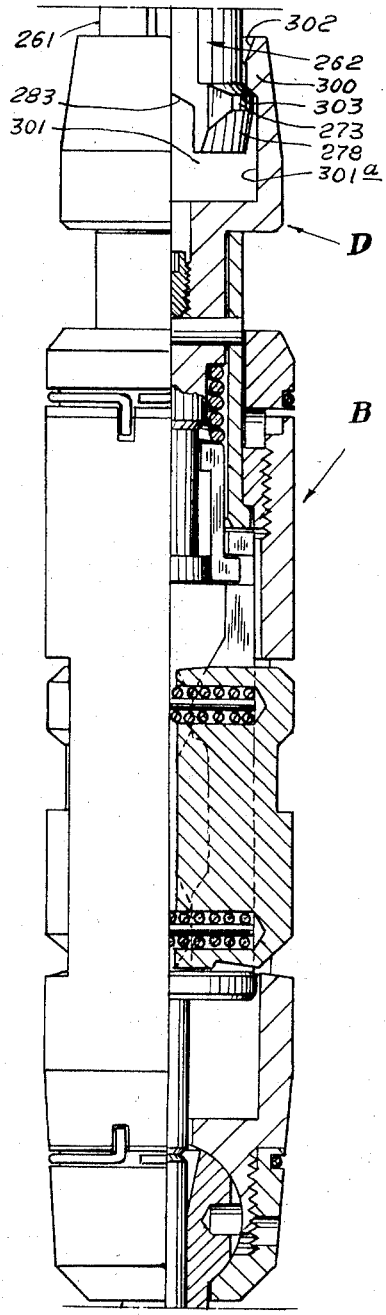

Referring to the drawings, a coupler 260 embodying the invention consists of longitudinally extending female and male members 261 and 262 yieldably held against relative radial and longitudinal movement by an encircling spring 263. The female coupler member 261 has a central semi-tubular section 264, spring retainer flanges 265 providing inwardly facing spring retainer shoulders 266 and outwardly convergent oppositely facing shoulders 267. Extending endwardly from the flanges 265 are reduced semi-tubular end sections 268 each of which is provided with an end flange 269. The end locking flanges 269 provide inwardly facing convergent shoulder surfaces 270 and opposing or oppositely facing outwardly convergent end shoulder surfaces 271. The flanges 265 and 269 are such substantially semi-circular in cross section.

The male coupler member 262 is provided with a central semi-tubular body section 272 having integral flanges 273 which provide inwardly facing spring retainer shoulders 274. The flanges 273 are provided with the oppositely facing outwardly convergent shoulders 275. Extending endwardly from the flanges 273 are reduced, semi-tubular, end sections 276 on each of which is formed an end locking flange 277. The locking flanges 277 have oppositely facing outwardly convergent end surfaces 278 and inside inwardly convergent facing shoulders 279. The spring retainer and end flanges together with the connecting reduced end sections of both the male and female connector members are identical in configuration.

The female member 261 has a pair of longitudinally extending parallel inside edge surfaces 280 which, along portions of their lengths as shown in FIGURE 1, mate with a pair of similar inside longitudinal parallel edge surfaces 281 along the male coupler member when the couplers are aligned. The contour of the edges 281 on the male member provide a longitudinally extending male lug 282 along each edge defined between inwardly convergent end shoulders 283. The edges 280 of the female connector member are each shaped to provide a longitudinally extending female recess 284 defined between facing inwardly divergent shoulders 285 which slope at substantially the same angles as the shoulders 283 on the male lugs. The male lugs are longer than the female recesses so that the entire length of the male lugs is not receivable in the recesses. Each end portion of each coupler member has an internal recess 290.

Figure 4A:
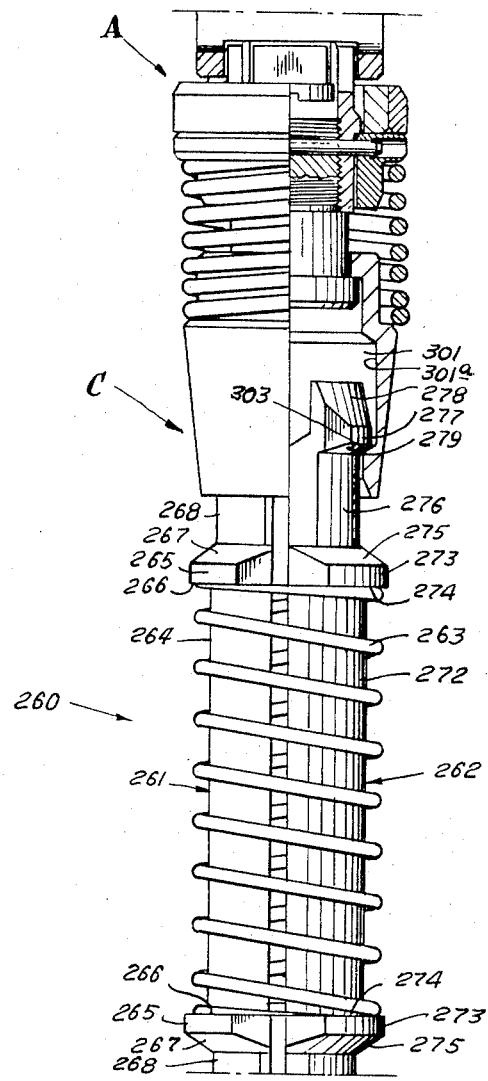

The normal relative positions to which the male and female coupler members are biased by the spring 263 are shown in FIGURES 1 and 4A–4B. The spring 263 encircles the semi-tubular central body sections 264 and 272 of the coupler members and is confined at opposite ends between the spring retainer shoulders 266 on the female member and 274 on the male member, respectively. The spring biases the coupler member toward the longitudinal alignment illustrated particularly in FIGURE 1 such that opposite end sections of the male lugs 282 and held in engagement with end female mating edge surfaces 281a which form the end sections of the mating edges of the female member extending endwardly from the female recess 284. Since the male lugs on the male coupler member are longer than the female recesses, when the lug edges are held in engagement with the end edge surfaces 281a along the mating edges of the female member, the male and female members are held in substantially parallel relationship with each other. So long as the male and female members of the coupler are held by the spring in the longitudinal alignment shown, they will remain in the parallel relationship with the male lugs unable to enter the female recesses.

FIGURES 4A and 4B illustrate the coupler 260 connected between adjacent spaced tool assemblies A and B which are provided with connector socket members C and D, respectively, into which the opposite end portions of the coupler are releasably locked. The coupler socket members C and D have identical functional features for the connection of the coupler 260 between the assemblies A and B. Such identical features are illustrated and referred to by the same reference numerals. Each of the coupler socket members C and D has an internal annular end flange 300 defining the outward open end of a socket chamber 301 for receiving one locking head end portion of the coupler. The flange 300 provides an outwardly divergent annular shoulder surface 302 and an inwardly divergent annular shoulder surface 303. Connector sockets, such as the sockets C and D, are connected to or comprise an integral part of any body or assembly, such as the tool assemblies A and B, which are interconnected with a coupler 260.

Since one of the basic functions of the coupler 260 is to provide an articulated connection between the bodies secured by it, such as the tool assemblies A and E, tolerance is provided between the end portions of the coupler received in the socket chambers 301 depending upon the degree of flexibility desired between each end portion of the coupler and the body to which it is connected within limits which does not permit the coupler to be accidentally disconnected by withdrawal from its socket chamber. For example, the diameter of a circle coincident with the outside surfaces of the tubular sections 268 and 276 of the coupler members, when the coupler members are in locked relationship, is less than the inside diameter of the shoulders 300 of the connector sockets so that the coupler may pivot to a limited extent relative to the connector sockets. Also, the diameter of a circle coincident with the outside surfaces of the locking flanges 269 and 277 on the female and male coupler members, respectively, is less than the diameter of a cylindrical wall portion 301a defining the locking socket recesses 301 to provide a limited degree of freedom of movement between the locking flanges within the recesses when the coupler is in locked relation within a locking socket.

The coupler is connected with adjacent apparatus, such as the tool assemblies A and B in FIGURES 4A–4B, by longitudinally misaligning the male and female members until the end sections of the members at the one end of the coupler may be compressed toward each other sufficiently for the locking flanges at that end of the coupler to pass within an internal annular locking flange in the tool to which the connector is being secured. Specifically, for example, to connect the coupler with the tool A, the male and female members of the coupler are grasped either manually or with suitable tools and displaced longitudinally relative to each other so that at the end of the coupler to be connected with the tool the end section of the male member is moved toward the female recess of the female member until the end shoulder 283 of the male lug 282 is between the end shoulders 285 defining the female recess. The male lug should be moved only a minor distance beyond the female recess shoulder. The desired relative movement of the coupler members is effected by applying a force to the shoulder 275 of the male member at the end of the coupler to be connected with the tool and either holding or applying an oppositely directed force to the shoulder 267 of the female member at the opposite end of the member from the end of the coupler to be connected with the tool. The spring stop shoulder 274 on the male member at its end against which a force is applied to the member compresses the spring 263 moving it away from the shoulder 266 at that end of the female member. At the other end of the female member the spring is compressed against its retainer shoulder 266 while being displaced from the male member spring retainer shoulder 274. An inward radial component of the forces applied to the sloping shoulders 267 and 275 to longitudinally misalign the coupler member biases the members toward each other. When the shoulders 283 on the male lugs at the ends of the lugs moving toward the female recess advance past the shoulder 285 of the female recess, the male member end portion at that end of the coupler is biased toward the female member with an end section of the male lug at such end of the coupler being received in the female recess so that the locking flanges 269 and 277 of the female and male members are moved closer together. The contracted locking flanges of the coupler at its compressed end are inserted past the internal locking flange 300 of the end connector of the tool A into the recess 301 of the tool connector C. When both of the locking flange shoulders 270 and 279 on the coupler members have been inserted into the locking recess past the internal annular shoulder 303 of the flange 300 the opposing forces being applied to the opposite end sections of the coupler members are relaxed allowing the spring 263 to expand so that the forces applied by the opposite ends of the spring against the stop shoulders 266 and 274 of the female and male coupler members, respectively, realign the members longitudinally. As the end of the male lug within the female recess 284 moves relative to the female member toward the adjacent end of the female member the shoulder 283 on the male lug engages the shoulder 285 defining the adjacent end of the female recess. The male lug is cammed outwardly from the female recess until the mating surfaces 281 on the male member again slide along the adjacent mating surfaces 281a of the female member as the coupler members return to longitudinal alignment. With the male and female members returned to their normal positions, the end section of the connector adjacent to the tool A is locked within the locking socket chamber 301 of the tool connector C.

The outside diameter of a circle coincident with the peripheral surfaces of the locking flanges 269 and 277 of the coupler within the locking socket recess of the tool is greater than the internal diameter of the locking flange 300 on the tool connector so that a force tending to pull the coupler away from the tool engages the locking flange shoulders 270 and 279 on the coupler members with the shoulders 303 on the internal annular flange 300 of the connector C of the tool. While such engagement between the shoulders 303 and the shoulders 270 and 279 of the coupler biases the end sections of the coupler towards each other, the longitudinal alignment of the male and female coupler members positions the end sections of the male lugs 283 within the piston member along the portions 281a of the adjacent mating surfaces of the female member so that the male and female member end sections cannot be cammed together sufficiently for the withdrawal of the coupler from the end socket member of the piston unit.

The coupler is similarly connected with the connector socket D at the upper end of the tool B by forcing the coupler members longitudinally in the other opposite directions relative to each other so that the other end section of the male lug adjacent the tool is receivable in the female recess of the female coupler member adjacent the tool. The coupler members at such ends are compressed together for insertion into the locking socket recess 301 of the connector D previously described.

It will be clear that the locking recess 301 in the connector sockets of the tools A and B must be sufficient length to permit the longitudinal displacement of the male and female coupler members required for the end sections of the coupler members to be compressed together for insertion into the connectors. Thus, the recesses must be longer than the distance between corresponding locking flange shoulders on the coupler member end portions when they are longitudinally displaced and compressed together. The locking recess 301 must also be of greater internal diameter than the external diameter of a circle coincident with the external surfaces of the locking flanges of the coupler members when the coupler members are in the position illustrated in FIGURE 1 to permit slight expansion of the adjacent ends thereof, for example, the lower ends thereof, FIGURE 2, when the members are misaligned to permit the connection of the coupler to a tool at one end while connected to another tool at its other end. The outer surfaces of the coupler members, when the coupler members are in alignment, must be spaced from the annular surface defining the recess 301 and the outer surfaces of the coupler members must be spaced from the flange 300 to permit pivotal movement of the coupling relative to the tools connected thereto.

The coupler is removable from the connected tools by longitudinally displacing its male and female members as described above to compress the end sections of the members together at the end of the connector which is to be removed from a locking socket recess. When the coupler member end sections are so compressed the coupler is withdrawn from the locking socket.

When only one end of the coupler is connected with an adjacent body or tool, the male and female coupler members may be displaced longitudinally relative to each other by utilizing the internal end portion grooves or recesses 290. For example, referring to FIGURE 1, a suitable tool, such as a screw driver, is employed to longitudinally displace the coupler members in opposite directions by moving the coupler member 262 downwardly relative to the coupler member 261 to disconnect the upper end of the coupler from a connected adjacent body. The blade end of the screw driver is inserted into the lower recess 290 of the member 262 while the shaft of the screw driver is rested against the lower end of the coupler member 261. The screw driver is rotated counterclockwise about its pivotal contact with the lower end of the member 261 forcing the member 262 downwardly relative to the member 261 until the male lug of the member 262 is aligned with and cammed into the female recess of the member 261. Similarly, the coupler members may be manipulated at either end moving either of the coupler members relative to the other by such use of a screw driver with the screw driver blade end being inserted into the internal groove 290 of one of the coupler members while the shaft of the screw driver is rested against and moved about the adjacent end edge of the other of the coupler members.

When adjacent tools connected by a coupler 260 are compressed toward each other longitudinally, each opposite end section of the coupler is forced farther into the locking socket recess of the tool to which it is connected until the outwardly facing shoulders, such as the shoulders 302 on the connector of the tool A, engage the shoulders 267 and 275 of the female and male members of the connector member. When such shoulders of adjacent tools interconnected by a connector member 260, such as the tools A and B, are engaged with the opposite end shoulders 267 and 275 on the coupler members an essentially solid connection is provided between the connected tools through the coupler members. The tolerances provided within the connector sockets, such as the sockets C and D of the tools A and B, and the locking flanges and other characteristics of the coupler 260 are such that an articulated connection is provided between adjacent tools connected by a coupler, thereby facilitating the movement of a tool train including a plurality of tools connected by couplers 260 through curved portions of a flow conductor. The male and female members of the coupler may be displaced longitudinally to a minor degree when the longitudinal axis of the coupler is not aligned with the longitudinal axis of the tools between which the coupler is secured. Sufficient displacement, however, is not effected to permit one end of the male lug to move into an end of the female recess and thus the coupler remains engaged within the locking socket of connected tools even while curved sections of a flow conductor are being traversed by the coupler and tools connected by it.

It will now be seen that a new and improved connecting device has been described and illustrated.

It will be further seen that a new and improved coupler for forming an articulated connection between adjacent spaced bodies has been described and illustrated.

It will be further seen that the coupler connects adjacent spaced bodies whereby they are movable relative to each other within predetermined limits.

It will be further seen that the coupler has opposite end portions each of which is releasably receivable within a locking socket chamber of adjacent spaced bodies interconnected by the coupler.

It will also be seen that the coupler has opposite end portions each of which is separately insertable, one at a time, into a locking socket of a body when the components of the coupler are moved relative to each other from first relative positions to second relative positions, and which are locked in the locking sockets when the components are returned to their first relative positions.

It will also be seen that the coupler includes relatively movable components biased to neutral relative positions at which the opposite end portions of the coupler are each releasably lockable with an adjacent body.

It will also be seen that the coupler comprises a pair of body members supported together by spring means and biased to a neutral position of generally parallel relationship and movable relative to each other against such spring means to a non-parallel relationship at which adjacent end portions of the body members at each end of the coupler are compressed toward each other while adjacent end portions at each other end of the coupler remain in a normal to slightly expanded relationship.

It will also be seen that the coupler comprises a pair of longitudinal body members having facing longitudinal edge surfaces engaging each other when the members are longitudinally aligned to hold the members in generally parallel relationship and having cooperating longitudinal recesses and lugs permitting the body members to be shifted to a non-parallel relationship with adjacent end portions of the members being compressible together at one end upon relative longitudinal displacement of the members in one direction and at the other end upon longitudinal displacement of the members in the other direction.

It will be further seen that the coupler comprises a pair of male and female body members each of which is generally half cylindrical in shape having end locking flanges and intermediately positioned spaced supporting flanges for holding a spring encompassing both of the members to support them together and to bias them toward longitudinal alignment with each other, one of the members being a female member provided with longitudinally extending female recesses included in its longitudinal inside edge surfaces, and the other of such members being a male member having longitudinally extending male lugs included in its inside longitudinal edge surfaces, the male lugs being of greater length than the female recesses whereby when the body members are longitudinally aligned they are held in generally parallel relationship by overlapping engagement of inside longitudinal edge surfaces of the male lugs with the longitudinal edge surfaces of the female member endwardly of its female recesses, and when longitudinally misaligned against the force of the spring the body members are compressible together along end portions at one end of the coupler when misaligned in one direction and at the other end of the coupler when misaligned in the other direction.

While it is indicated above that preferably the coupler members 261 and 262 are biased toward each other and longitudinal alignment under which conditions, of course, the internal diameter the spring 263 is slightly less than the diameter of the central portion of the coupler when its members are in alignment and the length of the spring is slightly greater than the distance between the spring retainer shoulders on the coupler members so that the spring is under compression when the coupler members are in alignment longitudinally. It is to be understood, however, that the radial and longitudinal biasing forces applied by the spring to the coupler members are not necessary for the functioning of the coupler so long as the relative dimensions of the spring and the coupler members are so related that when no forces are applied to either of the coupler members tending to misalign it from the other. The coupler members are supported by the spring in substantial longitudinal alignment and with their facing edge surfaces usbstantially in engagement with each other. For example, the coupler is operable when the length of its spring is substantially equal to the distance between the spring retainer shoulders on the coupler members and the internal diameter of the spring is substantially equal to the external diameter of the central portion of the coupler when its members are aligned longitudinally so that under conditions of rest the spring does not actually apply radial and longitudinal forces to the coupler members. With close tolerances, however, between the spring and the coupler members any longitudinal misalignment and radial expansion of the coupler members is resisted by the spring which in reaction to such misalignments applies an oppositely directed forces to the members biasing them toward their neutral or aligned positions.

The foregoing description of the invention is explanatory only, and changes in the details of the construction illustrated may be made by those skilled in the art, within the scope of the appended claims, without department from the spirit of the invention.

What is claimed and desired to be secured by Letters Patent is:

1. A coupler for interconnecting adjacent spaced bodies each having an open end locking recess therein comprising: a plurality of operably interconnected coupler members adapted for limited relative longitudinal and radial movement; resilient means supporting and interconnecting and biasing said members radially together and longitudinally to an aligned neutral position; coengageable means on each of said coupler members holding said coupler members in predetermined lateral coupling position when said coupler members are in said neutral position; said coupler members each having means at adjacent opposite end portions providing for operative disengagement of said coengageable means to permit such end portions of said adjacent coupler members to undergo limited compression together and out of operative lateral coupling position when said members are displaced longitudinally relative to each other.

2. A coupler as defined in claim 1 including a pair of coupler members wherein said coengageable means comprises a first of said coupler members having male means along a surface facing the second of said coupler members and engageable with the second of said couplers; and wherein said means providing for disengagement of said coengageable means comprises the second of said coupler members having female recess means along a surface facing said first coupler member for receiving said male means when said coupler members are misaligned longitudinally whereby adjacent end portions of said coupler members are compressible radially together for insertion of said end portions into a locking recess of one of said bodies interconnectable by said coupler.

3. A coupler as defined in claim 2 wherein the opposite end portions of each coupler member is provided with external locking flange means receivable in locking recesses of bodies interconnected by said coupler for holding said coupler end portions in said locking recesses.

4. A coupler for interconnecting adjacent ends of spaced bodies each having an endwardly opening locking recess comprising: a pair of coupler members adapted for limited longitudinal and radial movement relative to each other; a first of said coupler members having longitudinal male lug means along said member adjacent to the second of said members; the second of said coupler members having longitudinal female recess means along said member adjacent to said first coupler member for receiving an end portion of said male lug means when said coupler members are misaligned longitudinally permitting adjacent end portions of said coupler members to be radially compressed together for insertion into a locking recess of one of said spaced bodies; each of said coupler members having end portion means for holding the end portions of said coupler in said locking recesses; and resilient means supporting said coupler members together biasing said members radially toward and in longitudinal alignment with each other.

5. A coupler in accordance with claim 4 wherein each of said coupler members has a longitudinally extending recess providing a bore through said coupler and is provided with spaced flange means for confining said resilient means on said members.

6. A coupler as defined in claim 5 wherein said male lug means is longer than said female recess means.

7. A coupler as defined in claim 5 wherein opposite ends of said male lug means are spaced farther apart than opposite ends of said female recess means.

8. A coupler for interconnecting adjacent spaced bodies each having an endwardly opening locking recess for receiving one of the end portions of said coupler comprising: first and second substantially semi-tubular coupler members movably supported together for limited relative longitudinal and radial displacement; a first of said coupler members having longitudinal male lugs along inside edge surfaces facing the second of said coupler members; said second coupler member having longitudinal female recesses along inside edge surfaces adjacent to said first coupler member, said female recesses being adapted to receive portions of adjacent male lugs when said first and second coupler members are displaced longitudinally relative to each other, said female recesses receiving the end portions of said male lugs displaced toward said female recesses; said male lugs being longer than said female recesses whereby only end portions of said male lugs at one end of said coupler are receivable in said female recesses at one given time; spaced intermediate outside retainer flanges on said first and second coupler members; end locking flanges on opposite end portions of each of said first and second coupler members extending radially outwardly therefrom and adapted to be received within said locking recesses in said spaced bodies; and a spring around said first and second coupler members along central portions thereof confined between said intermediate retainer flanges for holding said coupler members together and biasing said members toward longitudinal alignment with each other when longitudinally misaligned from each other, said members being adapted to be displaced longitudinally relative to each other, end portions of said male lugs on said first coupler member being receivable in end portions of said female recesses on said second coupler member permitting radial contraction of end portions of said coupler members at one end of said coupler when said members are displaced in one direction and at the other end of said coupler when said members are displaced in the other direction.

9. A coupler as defined in claim 2 wherein said male means is longer than said female recess means.

10. A coupler comprising: a plurality of elongate coupler members movable longitudinally with respect to each other; coengageable means on each of said coupler members engageable with the surface of the adjacent coupler member holding said coupler means in an operative coupling position when said coupler members are in a neutral longitudinal position; means at the opposite end portions of each of said coupler members providing for movement of such end portions of said coupler members from operative coupling position to inoperative releasing position upon movement of said coupler members to a longitudinally offset position with respect to each other; and resilient means engaging each of said coupler members and biasing said members toward each other and toward said neutral longitudinal operative coupling position, said resilient means permitting said members to move longitudinally with respect to each other to said longitudinally offset inoperative uncoupling releasing position.

11. A coupler as defined in claim 10 wherein said coupler members are misaligned longitudinally relative to each other when engaging said coupler with a connected body and said coupler members are returned to longitudinal alignment for locking with said body.

12. A coupler comprising a pair of coupler members moveable longitudinally and laterally relative to each other for engaging the said coupler with a body member and wherein one of said coupler members has lug means comprising the coengageable means for holding said coupler members in operative coupling position and another of said coupler members has recess means for receiving said lug means when said coupler members are misaligned longitudinally providing for said coupler members to be moved toward each other when effecting a connection with said body and to cam said coupler members and hold said members farther apart for interlocking with said body.

13. A coupler comprising: operably interconnected coupler members adapted for limited relative longitudinal and lateral movement; resilient means supporting and interconnected said members biasing said members to an aligned neutral longitudinal position; coengageable means on opposite ends of said coupler members holding said coupler members in predetermined lateral coupling position when said coupling members are in said aligned neutral longitudinal position; said coupler members having means at adjacent opposite end portions providing for operative disengagement of said coengageable means at such end of said coupler members being disengaged to permit such end portions of said coupler members to undergo limited lateral movement toward each other to an uncoupling position when said members are displaced longitudinally relative to each other.

14. A coupler as defined in claim 8 wherein the internal diameter of said spring is substantially equal to the external diameter of a central portion of said coupler enclosed within said spring and the length of said spring is substantially equal to the distance between the spring retainer shoulders on said coupler members.

15. A coupler as defined in claim 8 wherein each of said coupler members has an internal recess in each end portion thereof for receiving tool means for misaligning one of said members longitudinally relative to the other of said members.

16. A coupler comprising: first and second substantially semi-tubular coupler members movably supported in side by side relationship for limited relative longitudinal movement; a first of said coupler members having longitudinal male lugs along longitudinal edge surfaces facing the second of said coupler members; said second coupler member having longitudinal female recesses along the longitudinal edge surface of said member facing the first of said coupler members, said female recesses being shorter than said male lugs and each being adapted to receive a portion of an adjacent male lug when said first and second coupler members are displaced longitudinally relative to each other, said female recesses each receiving an end portion of one of said male lugs displaced toward sadi female recess; said fisrt and second coupler members having spaced intermediate radially extending spring retainer flanges defining a central portion of said coupler members, each of said spring retainer flanges having end surfaces sloping outwardly and toward the longitudinal center of said coupler member, each of said coupler members having end locking flanges on opposite end portions thereof extending radially outwardly therefrom, each of said end locking flanges having a surface portion facing the longitudinal center of its respective coupler member sloping radially inwardly toward said center and having an end surface sloping radially inwardly toward the adjacent end of said coupler member; and a spring around said central portion of said coupler members enclosing said portions of said coupler members between said spring retainer flanges for biasing said members toward longitudinal alignment when said members are longitudinally misaligned from each other.

17. A coupler as defined in claim 16 wherein each of said coupler members has an inside recess along each end portion thereof for receiving tool means for longitudinally misaligning one of said coupler members relative to the other of said coupler members.

18. A coupler as defined in claim 16 wherein said spring is substantially equal in length to the distance between said spring retainer flanges and has an inside diameter substantially equal to the outside diameter of said central portion of said coupler when said coupler members are aligned longitudinally with each other.

19. A coupler as defined in claim 16 wherein opposite ends of said female recesses and opposite ends of said male lugs are spaced inwardly from adjacent ends of said coupler members.

References Cited

UNITED STATES PATENTS 2,591,788   4/1952   Day _____ 287—111

FOREIGN PATENTS 1,012,647   4/1952   France.

CARL W. TOMLIN, *Primary Examiner.*

W. L. SHEDD, *Assistant Examiner.*

U.S. Cl X.R.

287—104